United States Patent
Nie et al.

(10) Patent No.: US 8,477,843 B2
(45) Date of Patent: Jul. 2, 2013

(54) METHOD OF IMPLEMENTING IMPROVED RATE CONTROL FOR A MULTIMEDIA COMPRESSION AND ENCODING SYSTEM

(75) Inventors: Xiaochun Nie, Cupertino, CA (US); Thomas Pun, San Jose, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/078,922

(22) Filed: Apr. 1, 2011

(65) Prior Publication Data

US 2011/0243218 A1 Oct. 6, 2011

Related U.S. Application Data

(63) Continuation of application No. 10/716,316, filed on Nov. 17, 2003, now Pat. No. 7,940,843.

(60) Provisional application No. 60/434,137, filed on Dec. 16, 2002, provisional application No. 60/434,372, filed on Dec. 18, 2002.

(51) Int. Cl.
*H04N 7/26* (2006.01)
*H04N 7/30* (2006.01)
*H04N 7/24* (2006.01)

(52) U.S. Cl.
CPC ........... *H04N 7/3044* (2013.01); *H04N 7/3055* (2013.01); *H04N 7/3033* (2013.01); *H04N 7/3066* (2013.01)
USPC ............ 375/240.02; 375/240.06; 375/240.07; 375/240.24

(58) Field of Classification Search
USPC ....................................... 375/240.03–240.06
See application file for complete search history.

(56) References Cited

U.S. PATENT DOCUMENTS

| | | | |
|---|---|---|---|
| 5,038,209 | A | 8/1991 | Hang |
| 5,164,828 | A | 11/1992 | Tahara et al. |

(Continued)

FOREIGN PATENT DOCUMENTS

| | | |
|---|---|---|
| EP | 1091588 | 4/2001 |
| WO | 99/57908 | 11/1999 |

(Continued)

OTHER PUBLICATIONS

Portions of prosecution history of U.S. Appl. No. 10/427,669, Jun. 10, 2008, Nie, Xiaochun, et al.

(Continued)

*Primary Examiner* — David Czekaj
*Assistant Examiner* — David N Werner
(74) *Attorney, Agent, or Firm* — Adeli & Tollen LLP

(57) ABSTRACT

The rate controller in a digital video encoding system is responsible for allocating a bit budget for video frames to be encoded. The rate controller considers many different factors when determining the frame bit budget. One of the factors considered is the complexity of the frames being compressed. Occasionally there will be a very complex frame that is not representative of the overall video frame sequence. Such a rare complex frame may cause a disproportionate affect on the bit budget allocation. The system of the present invention limits the amount that a very complex frame can change the bit budget allocation. The rate controller of the present invention also includes a relaxation factor. The relaxation factor allows a user to determine if the rate controller should strictly allocate its bit budget or relax its standards such that the rate controller may not be so conservative when allocating bits to frames.

23 Claims, 8 Drawing Sheets

U.S. PATENT DOCUMENTS

| | | | |
|---|---|---|---|
| 5,231,484 A | | 7/1993 | Gonzales et al. |
| 5,241,383 A | | 8/1993 | Chen et al. |
| 5,333,012 A | | 7/1994 | Singhal et al. |
| 5,469,208 A | | 11/1995 | Dea |
| 5,623,308 A | | 4/1997 | Civanlar et al. |
| 5,629,779 A | * | 5/1997 | Jeon ............................ 382/239 |
| 5,650,860 A | | 7/1997 | Uz |
| 5,654,760 A | | 8/1997 | Ohtsuki |
| 5,677,969 A | | 10/1997 | Auyeung et al. |
| 5,682,204 A | | 10/1997 | Uz et al. |
| 5,726,711 A | | 3/1998 | Boyce |
| 5,729,633 A | * | 3/1998 | Watanabe et al. ............. 382/239 |
| 5,790,196 A | | 8/1998 | Sun et al. |
| 5,801,779 A | | 9/1998 | Uz et al. |
| 5,847,766 A | | 12/1998 | Peak |
| 5,872,598 A | | 2/1999 | Legall et al. |
| 5,929,914 A | | 7/1999 | Normand |
| 5,929,916 A | | 7/1999 | Legall et al. |
| 5,937,138 A | | 8/1999 | Fukuda et al. |
| 5,986,712 A | | 11/1999 | Peterson et al. |
| 5,990,958 A | | 11/1999 | Bheda et al. |
| 6,014,181 A | | 1/2000 | Sun |
| 6,023,296 A | | 2/2000 | Lee et al. |
| 6,125,147 A | | 9/2000 | Florencio et al. |
| 6,134,663 A | | 10/2000 | Nakamura et al. |
| 6,141,448 A | | 10/2000 | Khansari et al. |
| 6,160,846 A | | 12/2000 | Chiang et al. |
| 6,167,085 A | | 12/2000 | Saunders et al. |
| 6,198,878 B1 | | 3/2001 | Blawat et al. |
| 6,212,233 B1 | | 4/2001 | Alexandre et al. |
| 6,226,326 B1 | | 5/2001 | Mihara |
| 6,229,849 B1 | | 5/2001 | Mihara |
| 6,263,020 B1 | | 7/2001 | Gardos et al. |
| 6,282,241 B1 | | 8/2001 | Saw |
| 6,310,897 B1 | | 10/2001 | Watanabe et al. |
| 6,324,217 B1 | | 11/2001 | Gordon |
| 6,347,117 B1 | | 2/2002 | Kato et al. |
| 6,480,539 B1 | | 11/2002 | Ramaswamy |
| 6,510,176 B1 | | 1/2003 | Fukuda et al. |
| 6,535,251 B1 | | 3/2003 | Ribas-Corbera |
| 6,587,506 B1 | | 7/2003 | Noridomi et al. |
| 6,639,942 B1 | | 10/2003 | Bayazit |
| 6,694,060 B2 | | 2/2004 | Liu et al. |
| 6,763,067 B2 | | 7/2004 | Hurst |
| 6,831,947 B2 | | 12/2004 | Ribas Corbera |
| 6,847,656 B1 | | 1/2005 | Wu et al. |
| 6,944,221 B1 | | 9/2005 | Keesman |
| 6,961,376 B2 | | 11/2005 | Wu et al. |
| 6,961,378 B1 | | 11/2005 | Greenfield et al. |
| 6,963,608 B1 | | 11/2005 | Wu |
| 7,079,581 B2 | | 7/2006 | Noh et al. |
| 7,103,099 B1 | | 9/2006 | Paz et al. |
| 7,123,654 B2 | * | 10/2006 | Song ........................ 375/240.02 |
| 7,277,595 B1 | | 10/2007 | Reid |
| 7,418,037 B1 | | 8/2008 | Nie et al. |
| 7,545,994 B2 | | 6/2009 | Reid |
| 7,769,084 B1 | | 8/2010 | Pun et al. |
| 7,804,897 B1 | | 9/2010 | Pun et al. |
| 7,940,843 B1 | | 5/2011 | Nie et al. |
| 2001/0000704 A1 | | 5/2001 | Fert et al. |
| 2001/0031002 A1 | | 10/2001 | Hashimoto et al. |
| 2002/0001344 A1 | | 1/2002 | Morris et al. |
| 2002/0012395 A1 | | 1/2002 | Song et al. |
| 2002/0031178 A1 | * | 3/2002 | Isozaki ................... 375/240.12 |
| 2002/0034246 A1 | | 3/2002 | Yamada et al. |
| 2002/0067768 A1 | | 6/2002 | Hurst |
| 2002/0085636 A1 | | 7/2002 | Uenoyama et al. |
| 2002/0094082 A1 | | 7/2002 | Jones et al. |
| 2002/0126752 A1 | | 9/2002 | Kim |
| 2002/0136295 A1 | | 9/2002 | Sato |
| 2002/0136304 A1 | | 9/2002 | Akhan et al. |
| 2002/0163964 A1 | | 11/2002 | Nichols |
| 2002/0181589 A1 | * | 12/2002 | Wake et al. .............. 375/240.14 |
| 2003/0072364 A1 | | 4/2003 | Kim et al. |
| 2003/0142751 A1 | | 7/2003 | Hannuksela |
| 2003/0206584 A1 | * | 11/2003 | Morita et al. ............ 375/240.02 |
| 2005/0036548 A1 | * | 2/2005 | He et al. ................... 375/240.12 |
| 2005/0286631 A1 | | 12/2005 | Wu et al. |
| 2006/0013298 A1 | | 1/2006 | Tong et al. |
| 2009/0010325 A1 | | 1/2009 | Nie et al. |
| 2011/0007798 A1 | | 1/2011 | Pun et al. |

FOREIGN PATENT DOCUMENTS

| | | |
|---|---|---|
| WO | WO 99/57908 | 11/1999 |
| WO | 02/096120 | 11/2002 |
| WO | WO 02/096120 | 11/2002 |

OTHER PUBLICATIONS

Porions of prosecution hisory of U.S. Appl. No. 12/165,625, Aug. 22, 2008, Nie, Xiaochun, et al.

Portions of prosecution history of U.S. Appl. No. 10/716,316, Mar. 31, 2011, Nie, Xiaochun, et al.

Portions of prosecution history of U.S. Appl. No. 10/716,265, Aug. 24, 2010, Pun, Thomas, et al.

Westerink, P.H., et al., "Two-pass MPEG-2 Variable-Bit-Rate Encoding," IBM J. Res. Develop. Jul. 1999, pp. 471-488, vol. 43, No. 4, International Business Machines Corporation, Armonk, New York, USA.

Portions of prosecution history of U.S. Appl. No. 10/716,265, mailed Aug. 24, 2010, Pun, Thomas, et al.

Author Unknown, "IEEE 100: The Authoritative Dictionary of IEEE Standards Terms Seventh Edition," Dec. 2000, IEEE, New York, New York, USA.

Chow, King-Wai, et al., "Complexity Based Rate Control for MPEG Encoder," IEEE International Conference on Image Processing, Nov. 13-16, 1994, pp. 263-267, vol. 1, Austin, Texas, USA.

Lee, Hung-Ju, et al., "Scalable Rate Control for MPEG-4 Video," IEEE Transactions on Circuits and Systems for Video Technology, Sep. 2000, pp. 878-894, vol. 10, No. 6, IEEE.

Lee, Liang-Wei, et al., "On the Error Distribution and Scene Change for the Bit Rate Control of MPEG," IEEE Transactions on Consumer Electronics, Jun. 8-10, 1993, pp. 545-554, vol. 39, Issue 3, IEEE.

Teixeira, Luis, et al., "Analysis of a Two Step MPEG Video System," International Conference on Image Processing, Oct. 26-29, 1997, pp. 350-352, vol. 1, Washington, DC, USA.

* cited by examiner

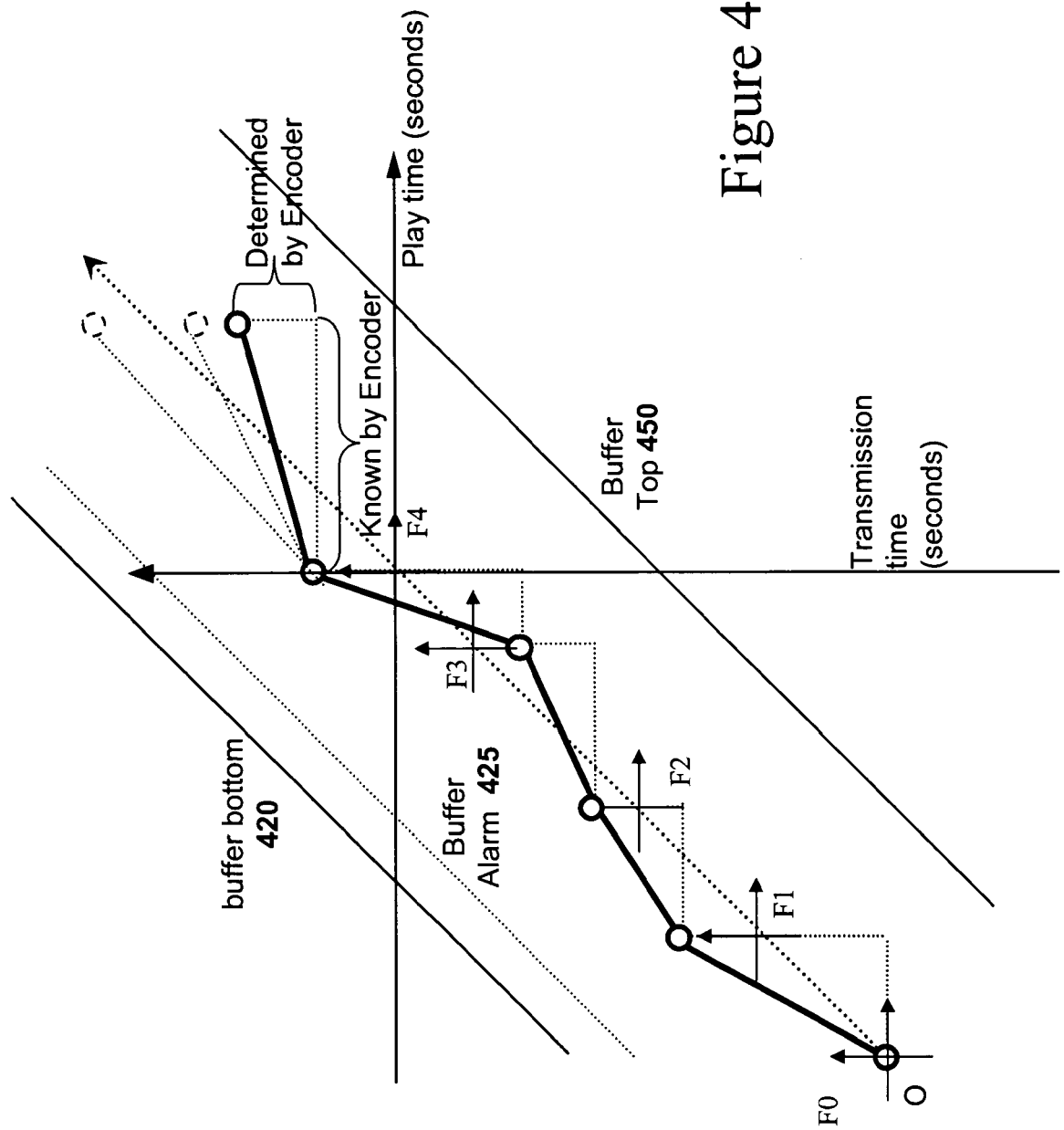

METHOD OF IMPLEMENTING IMPROVED RATE CONTROL FOR A MULTIMEDIA COMPRESSION AND ENCODING SYSTEM

CLAIM OF BENEFIT TO PRIOR APPLICATIONS

This application is a continuation application of U.S. patent application Ser. No. 10/716,316, filed Nov. 17, 2003 now U.S. Pat. No. 7,940,843. U.S. patent application Ser. No. 10/716,316 claims the benefit of U.S. Provisional Patent Application 60/434,137, entitled "Method of Implementing Improved Rate Control For A Multimedia Compression And Encoding System", filed on Dec. 16, 2002. U.S. patent application Ser. No. 10/716,316 also claims the benefit of U.S. Provisional Patent Application 60/434,372, entitled "Method of Implementing Improved Rate Control For A Multimedia Compression And Encoding System", filed on Dec. 18, 2002. U.S. patent application Ser. No. 10/716,316 is incorporated herein by reference.

FIELD OF THE INVENTION

The present invention relates to the field of multi-media compression systems. In particular the present invention discloses methods and systems for implementing a rate controller that efficiently allocate a bit budget for items to be compressed.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio-layer 3) are now taking market share from the first generation digital audio format of compact discs.

The video media has been slower to move to digital storage and transmission formats than audio. This has been largely due to the massive amounts of digital information required to accurately represent video in digital form. The massive amounts of information require very high-capacity digital storage systems and high-bandwidth transmission systems.

However, video is now rapidly moving to digital storage and transmission formats. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due their high video quality, very high audio quality, convenience, and extra features. The antiquated analog NTSC (National Television Standards Committee) video transmission system is now being replaced with the digital ATSC (Advanced Television Standards Committee) video transmission system.

Computer systems have been using various different digital video formats for a number of years. Among the best digital video compression and encoding systems used by computer systems have been the digital video systems backed by the Motion Pictures Expert Group known as MPEG. The three most well known and highly used digital video formats from MPEG are known simply as MPEG-1, MPEG-2, and MPEG-4. (The MPEG-2 digital video compression and encoding system is used by DVDs.)

The MPEG-2 and MPEG-4 standards compress a series of video and encode the compressed frames into a digital stream. Video frames may be compressed as Intra-frames or Inter-frames. An Intra-frame independently defines a complete video frame. An Inter-frame defines a video frame with reference to other video frames, previous or subsequent to the current frame.

When compressing video frames, an MPEG-2 and MPEG-4 encoder usually implements a 'rate controller' that is used to allocate a 'bit budget' for each video frame that will be compressed. The bit budget specifies the number of bits that have been allocated to encode the video frame. By efficiently allocating a bit budget to each video frame, the rate controller attempts generate the highest quality compressed video stream without overflowing buffers (sending more information than can be stored) or underflowing buffers (not sending frames fast enough such that the decoder runs out of frames to display). Thus, to best compress and encode a digital video stream, a digital video encoder needs a good rate controller. The present invention introduces new methods and systems for implementing a rate controller for a digital video encoder.

SUMMARY OF THE INVENTION

A rate controller for allocating a bit budget for video frames to be encoded is disclosed. The rate controller of the present invention considers many different factors when determining the frame bit budget. One of the factors considered is the complexity of the frames being compressed. Occasionally there will be a very complex frame that is not representative of the overall video frame sequence. Such a rare complex frame may cause a disproportionate affect on the bit budget allocation. The system of the present invention limits the amount that a very complex frame can change the bit budget allocation.

The rate controller of the present invention also includes a relaxation factor. The relaxation factor allows a user to determine if the rate controller should strictly allocate its bit budget or relax its standards such that the rate controller may not be so conservative when allocating bits to frames.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 4 illustrates the conceptual video frame transmission model of FIG. 3 with a shifting coordinate system.

DETAILED DESCRIPTION OF THE PREFERRED EMBODIMENT

A method and system for performing rate control in a multi-media compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems.

Multimedia Compression and Encoding Overview

Figure 1:
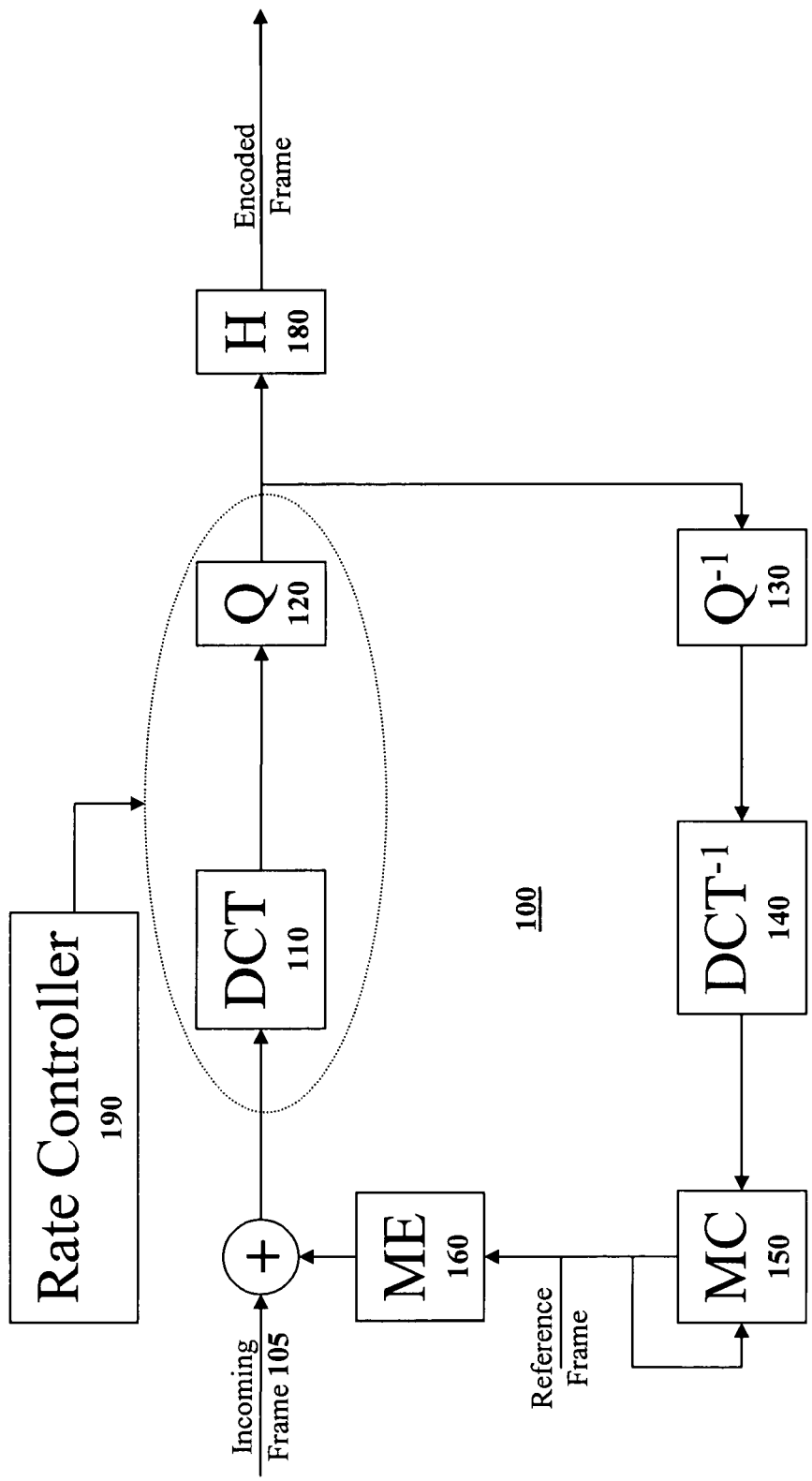
FIG. 1 illustrates a block diagram of a digital video encoder.

FIG. 1 illustrates a high level block diagram of a typical digital video encoder 100 as is well known in the art. The digital video encoder 100 receives incoming video stream 105 at the left of the block diagram. Each video frame is processed by a Discrete Cosine Transformation (DCT) unit 110. The frame may be processed independently (an intra-frame) or with reference to information from other frames received from the motion compensation unit (an inter-frame). A Quantizer (Q) unit 120 then quantizes the information from the Discrete Cosine Transformation unit 110. The quantized frame is then encoded with an entropy encoder (H) unit 180 to produce an encoded bitstream.

Since an inter-frame encoded video frame is defined with reference to other nearby video frames, the digital video encoder 100 needs to create a copy of how each video frame will appear within a digital video decoder such that inter-frames may be encoded. Thus, the lower portion of the digital video encoder 100 is actually a digital video decoder. Specifically, Inverse quantizer ($Q^{-1}$) 130 reverses the quantization of the video frame information and inverse Discrete Cosine Transformation ($DCT^{-1}$) unit 140 reverses the Discrete Cosine Transformation of the video frame information. After all the DCT coefficients are reconstructed from iDCT, the motion compensation unit will use the information, along with the motion vectors, to reconstruct the video frame.

The reconstructed video frame may then be used as a reference frame for the motion estimation of other video frames. Specifically, the decoded video frame may be used to encode inter-frames that are defined relative to information in that decoded video frame. The motion compensation (MC) unit 150 and a motion estimation (ME) unit 160 are used to determine motion vectors and generate differential values used to encode inter-frames.

A rate controller 190 receives information from many different components in a digital video encoder 100 and uses that information to allocate a bit budget for each video frame. The bit budget should be assigned in a manner that will generate the highest quality digital video bit stream that that complies with a specified set of restrictions.

The rate controller 190 must attempt to generate the highest quality compressed video stream without overflowing buffers (exceeding the amount of available memory by sending more video information than can be stored by a receiver) or underflowing buffers (not sending video frames fast enough such that a decoder runs out of frames to display). Details on buffer overflow and buffer underflow will be presented later in this document.

Models Used For Rate Controller Creation

Various different models can be used to illustrate the problems to be handled by a MPEG-4 video rate controller. A transmission model may be used to model the timing of video frame transmissions and buffer occupancy in a receiver. Rate distortion models are used to select a quantizer value in the Quantizer (Q) unit 120. Different rate distortion models are for inter-frame quantizer selection and intra-frame quantizer selection.

The rate transmission model simulates data transmission across a communication channel (such as a computer network or a video signal transmission path) and buffer occupancy in the digital video decoder of a digital video player. Typically, in a computer network embodiment, the compressed video data is transmitted from server through a network with a constant bandwidth to a client system. On the client side, a digital video player has a memory buffer to cache incoming digital video information received across the network. The digital video player in a client system can be required to cache certain amount of digital video information before the digital video player begins to play the video stream.

When digital video is streamed from a server system across a network to a digital video player in a client system, the digital video player will not be able to start playing the video until at least the information defining the first video frame arrives. However, the digital video player should not immediately begin playing the video stream after receiving only the first video frame. For example, what if the second video frame takes longer time to arrive than the intended display duration of the first video frame? In such a situation, the memory buffer of the digital video player lacks the information needed to display the next video frame. This condition is referred to as 'buffer underflow' in the digital video player. To prevent this situation, there should be a minimum 'buffer occupancy' requirement for the digital video player. The minimum buffer occupancy requirement for the digital video player will allow the digital video player to accommodate the fluctuation in video frame sizes and network bandwidth limits.

On the other hand, a server system may send overly large video frame that exceeds the physically limited amount of memory buffer space available to the digital video player. Or the server system may send a number of video frames faster than the video frames can be decoded and displayed. In these cases where the amount of transmitted digital video information exceeds the digital video player's maximum buffer size, a 'buffer overflow' condition occurs. When a buffer overflow occurs, the digital video player may discard the digital video frame that exceeded the memory buffer limitations. For handheld devices with limited amounts of memory, the memory buffer restriction is more critical than in a desktop computer with a hard drive available as secondary memory.

To conceptually illustrate when such buffer underflow and buffer overflow conditions may occur, a video frame transmission model has been created. The transmission model conceptually illustrates the transmission and playing of a sequence of video frames with reference to the available network bandwidth and digital video player's memory buffer resources.

A Temporal Video Frame Model

Each digital video frame transmitted across a communication medium has two temporal properties: frame display duration (the amount of time that the video frame should be displayed on the digital video player's display screen) and video frame transmission duration (the amount of time that is required to transmit the digital video frame across the communication medium). These two temporal properties are very important to the operation of the rate controller that must allocate frame bit budgets in a manner that obtains high quality video yet avoids the problems of buffer underflow and buffer overflow.

Figure 2A:
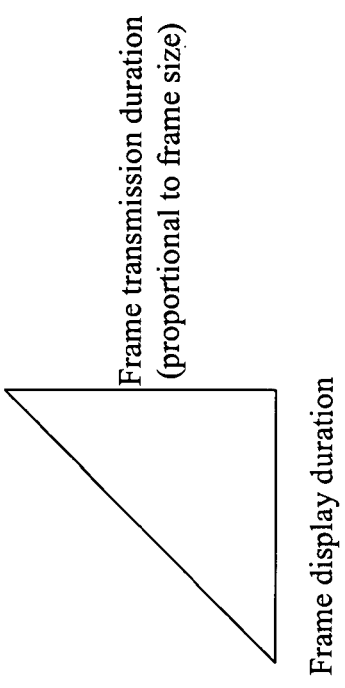
FIG. 2a illustrates a temporal conceptual diagram of a video frame.

FIG. 2a illustrates a conceptual temporal model for a video frame that illustrates the video frame display duration and the video frame transmission duration properties. The video frame display duration, the time to display this particular frame on the digital video player, is represented as line along the horizontal axis. The longer that the video frame must be displayed, the longer the line along the horizontal axis. The video frame transmission duration, the time it takes to transmit the compressed digital video frame information (for example, from server to player), is represented as line along the vertical axis. The video frame transmission duration is actually generated from two vertical values: the size of the digital video frame (in bits) and the bandwidth (in bits per second) of the communication channel. Since the size of a digital video frame in bits is generated by the rate controller and the bandwidth of the communication channel are known, the transmission time of a frame can be determined from the relation:

Transmission time=(digital video frame size)/(communication channel bandwidth).

As illustrated in FIG. 2a, the relation of these two temporal properties (video frame display duration and video frame transmission duration) of a video frame can be illustrated as a right-angled triangle with the video frame display duration along the horizontal access and the video frame transmission duration along the vertical axis. If a video frame has a video frame display duration that equals the video frame transmission duration, the triangle will be an isosceles triangle with forty-five degree angles as illustrated in FIG. 2a.

Figure 2B:
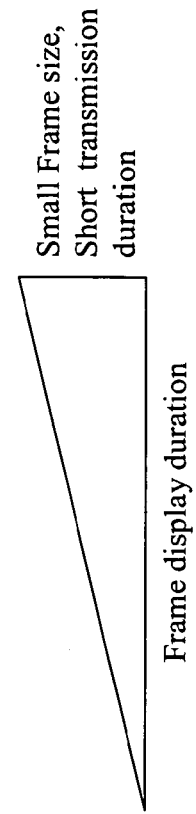
FIG. 2b illustrates a temporal conceptual diagram of a video frame that takes longer to transmit than it will be displayed.

If a video frame has a video frame transmission duration time that is longer than the video frame display duration then the video frame triangle's will have an angle greater than forty-five degree in the lower left corner as illustrated in FIG. 2b. An intra-frame, a video frame that completely defines a video frame appearance independently without reference to other video frames, typically has a video frame representation as illustrated in FIG. 2b wherein the video frame transmission time exceeds the video frame display time.

Figure 2C:
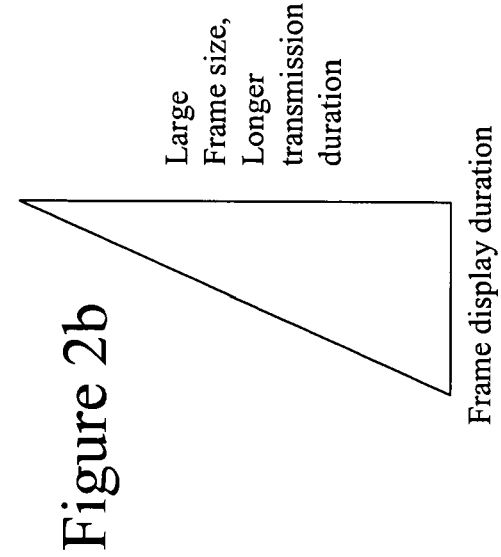
FIG. 2c illustrates a highly compressed video frame that is transmitted much faster than it will be displayed.

If a video frame has a video frame transmission duration that is shorter than the video frame display duration then the video frame right-triangle will have an angle less than forty-five degrees in the lower left corner as illustrated in FIG. 2c. An efficiently compressed inter-frame, a video frame that is defined with reference to information from other nearby video frames, typically has a temporal video frame representation as illustrated in FIG. 2c wherein the video frame display time exceeds the video frame transmission time.

The Video Frame Sequence Transmission Model

A sequence of transmitted digital video frames can be represented by piling up a series of right-angled video frame triangles as illustrated in FIGS. 2a to 2c. Specifically, FIG. 3 illustrates a conceptual video frame transmission model created from a sequence of right-angled triangular video frame models.

Figure 3:
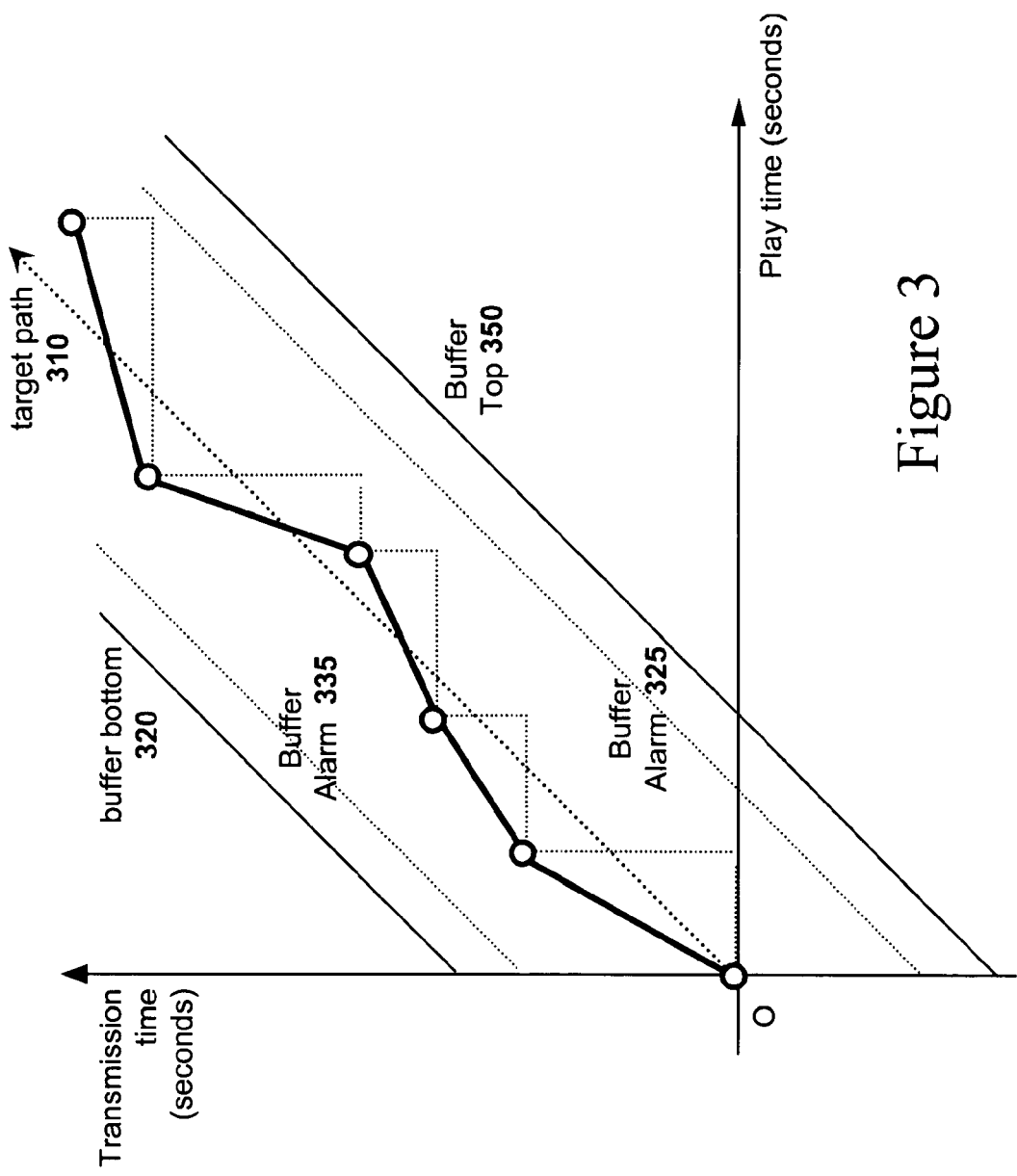
FIG. 3 illustrates a conceptual video frame transmission model created from a sequence of right-angled triangular video frame models.

By connecting the hypotenuses of these right-angled triangular video frame models, a snaking video frame sequence transmission path is created as illustrated in FIG. 3. The horizontal axis represents the display times of the video frames and the vertical axis represents the transmission time of the video frames.

The actual snaking video frame sequence transmission path is overlaid on top of a target transmission path. The target transmission path represents a transmission path wherein the high quality video bitstream is achieved by transmitting a series of video frames with a sum of transmission times equal to the sum of the display times of the video frames. The target transmission path is not actually an ideal transmission path since the compression system will compress some frames better than others such that video frames that are easily compressed should be allocated fewer bits (and thus have a shorter transmission time) and frames that do not easily should be allocated more bits (and thus have a larger transmission time). However, an ideal path should closely follow the target path or else buffer overflow or buffer underflow problems will occur.

The digital video player's buffer size limitations and minimum buffer occupancy requirement can also be represented as proportional time quantified values. Thus, the digital video player's buffer size limitation and minimum player buffer occupancy requirement can be illustrated on the temporal video frame transmission model of FIG. 3.

Memory Buffer Underflow

The digital video player's minimum buffer occupancy can be interpreted as the digital video player's waiting time along the horizontal axis before the first frame is played in order to prevent buffer underflow. If the player does not wait a needed minimum amount of time along the horizontal access then the digital video player may quickly display all the available video frames and then be forced to wait for the transmission of the next video frame in the video frame sequence.

A buffer underflow can also occur if the digital video server transmits too many video frames that are very large in size (and thus have long transmission times) but have short display durations. The underflow occurs because the short display duration of a few large video frames causes the digital video player to quickly display and remove the received video frames from the buffer until the digital video player exhausts all the available video frames before receiving subsequent video frames.

To prevent this situation, a forty-five degree 'buffer bottom' line 320 places an upper bound on the allowed transmission path and thus limits the video frame transmission time (and thus video frame bit size) of a subsequent video frame to be transmitted. By limiting the transmission path to fall below the buffer bottom line 320, the player will not become starved for new video frames to display. A buffer bottom alarm line 335 may be used to inform the server than the receiver may be nearing a memory buffer underflow condition.

Memory Buffer Overflow

The player's memory buffer size limitation can be interpreted as the time to fill up the digital video player's memory buffer (along the vertical axis) if no video frame information is taken out of the memory buffer. If video frames are not displayed and subsequently removed from the memory buffer at a fast enough rate then the limited memory buffer will overflow with video frame information. Thus, if too many video frames with duration times longer than their transmission times are sent in quick succession, the digital video player may overflow its memory buffers.

To prevent buffer overflows, a 'buffer top' line 350 may be used to limit the rate at which the encoder will create short transmission time frames that have long display times. By limiting the transmission path to remain above the buffer top line 350, the digital video player will not overflow its memory buffers with video frames to display. A buffer top alarm line 325 may be used to inform the server than the receiver may be nearing a memory buffer overflow condition.

Temporal Model Coordinate System Origin

Starting from the first video frame, the origin of the coordinate system with coincides with the current buffer position. The horizontal axis represents the playing time and the vertical axis represents the transmission time of each video frame sent. In one embodiment, the system will update the origin of the coordinate system to a new position on the transmission model after the encoder creates each new video frame, as illustrated in FIG. 4. The origin always slides to the right to the end of the previous frame's play duration and is aligned vertically on the target transmission path. Since the duration of the next frame to be encoded is known to the video encoder, and the vertical axis always passes the position of the new frame, the updated coordinate system can be determined.

FIG. 4 illustrates a series of video frame coordinate systems F0, F1, F2, F3 and F4 as updated coordinate systems as time progresses. For each new frame, the goal is to find a vertical position (transmission duration or frame size) of the new video frame so that the position of the next node fulfills the buffer restrictions. Specifically, the next node must fall between the buffer top 450 and the buffer bottom 420 lines. As illustrated by coordinate system F4, the encoder knows the display duration of the next frame (the horizontal aspect of the next frame's triangle) but it must determine the transmission time or frame size (that is represented by the vertical aspect of the next frame's triangle).

Rate Controller Improvements

Figure 5A:
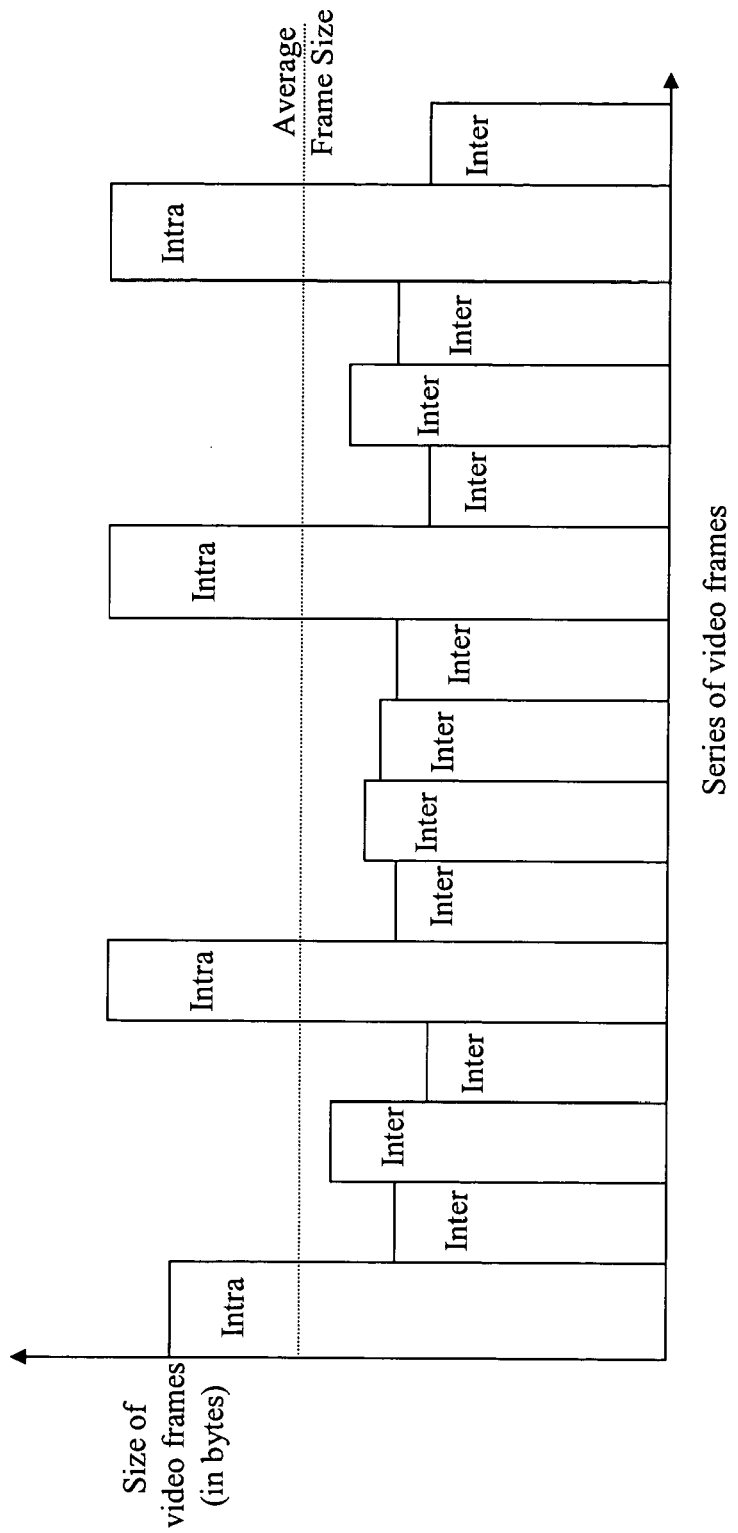
FIG. 5a illustrates a conceptual illustration of a series of encoded video frames having different sizes (in number of bytes) and an average frame size.

As previously set forth, a real transmission path will generally always have a certain amount of deviation about the target transmission path. Normally, the compressed video frame sizes vary within a certain range. For example, FIG. 5*a* illustrates a bar chart of a series of encoded video frames having different sizes (in number of bytes) represented by a height and an average frame size. Note that the Intra-frames generally use a significantly larger number of bytes than inter-frames since intra-frame must be completely self-defined whereas inter-frames are able to reference information in other nearby video frames.

The temporal transmission model set forth in the previous section provides a valuable tool that may be used predict the memory buffer condition in a digital video player that would receive and decode the digital video stream. Thus, the rate controller in a digital video encoder may use the temporal transmission model to prevent any memory buffer overflows or memory buffer underflows from occurring. Specifically, the rate controller should allocate target bit budgets for each video frame in a manner to achieve maximum video quality while still satisfying the memory buffer restrictions that prevent memory buffer overflow or memory buffer underflow.

A rate controller using the temporal transmission model and other teachings of the present invention can be implemented in computer instructions on any suitable computer system. The computer instructions may be placed onto a computer-readable medium and distributed. The computer instructions may also be transmitted across a communication channel to receiving system. For example, a computer program implementing the teachings of the present invention may be transmitted from a server computer across a computer network to a client computer system and then executed on that client computer system.

Frame Complexity

The content of different video sequences varies significantly. Furthermore, even the different video frames within the same video sequence can vary quite significantly. For example, scene changes and fast cuts will significantly change the characteristics of a video stream. Thus, each individual inter-frame or intra-frame within the same video sequence may need a different number of bits in order to achieve approximately the same level of visual quality.

The complexity of a video frame can be measured by mean average difference (MAD) for the video frame. The mean average difference (MAD) is the mean of the Sum of Absolute Differences (SAD) values for the macroblocks in the video frame. To prevent any quick large changes caused by unusual video frames, an average MAD value may be calculated across the history of a number of frames may be calculated. In one embodiment, the average MAD (avgMAD) can be calculated by doing weighted average of the MAD of a current frame (curMAD) and the historical average MAD (avgMAD) as follows:

```
#define kMADWeight 0.2 // Make historical MAD 20% of weight
avgMAD = avgMAD * kMADWeight + (1- kMADWeight) * curMAD
```

In one embodiment, the system maintains two different running historical MAD averages, one MAD average for intra-frames and one MAD average for non intra-frames. These two different MAD averages are kept because the comparisons between the MAD values for intra-frames and the MAD values for non intra-frames are not very useful.

Then, using the average MAD, a target bit hint (targetBitsHint) value may be calculated. The target bit hint (targetBitsHint) represents how much deviation there is between the current video frame and the average video frame in terms of bits needed to encode the current video frame for a desired visual quality. The target bit hint (targetBitsHint) may be calculated as follows:

```
targetBitsHint=(curMAD−avgMAD)/avgMAD;
```

Figure 5B:
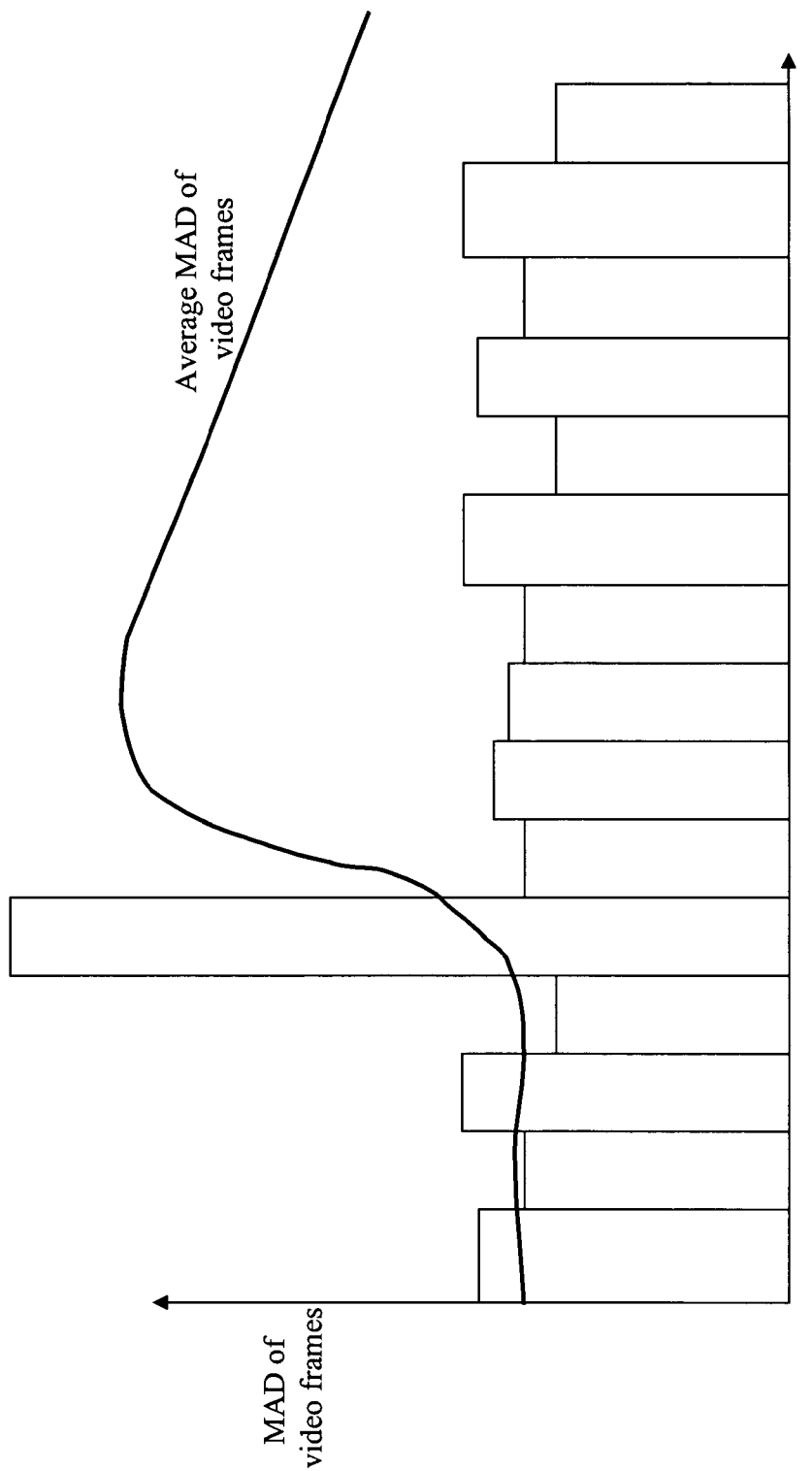
FIG. 5b illustrates a conceptual illustration of a series of encoded video frames having different MAD values and a running average MAD value.

However, a single very complex video frame can significantly affect the average such that average is not representative. For example, FIG. 5*b* illustrates the calculated MAD for a series of video frames and the calculated average MAD. As illustrated in FIG. 5*b*, a single very complex video frame can move the average MAD a large amount (due to the 80% weight) such that the average MAD is then not very representative of the overall MAD value for video frame sequence. To prevent such a situation, a cap may be placed on how much the average MAD can be affected by any single video frame.

In one embodiment, a non-linear smoothing filter is applied when tracking local averages of video frame complexity and video frame size. The non-linear smoothing filter places a limitation extent to which new data can contribute to the local average (e.g. by a cap, a scaling factor, or both). The following program listing describes one possible implementation of a non-linear smoothing filter that may be used:

```
static float GetWeightedAverage(float historyData, float
    newData, float historyWeight, float fluctuationLimit)
{
```

-continued

```
    float  dif = 0;
    if( historyData != 0 )
    {
       // Calculate a difference from historical value
       dif = ( newData – historyData ) / historyData;
       // Cap the amount of fluctuation allowed
       if( dif > fluctuationLimit) dif = fluctuationLimit;
       if( dif < –fluctuationLimit) dif = –fluctuationLimit;
       historyData = historyData *
                          (1 + dif * (1 – historyWeight));
    }
    else
       historyData = newData;
    return historyData;
}
where
    historyData is the running historical MAD average;
    newData is the newly calculated MAD data;
    fluctuationLimit defines the amount that the average MAD
       may fluctuate by; and
    historyWeight is the amount of weight assigned to the
       past history when creating the weighted average MAD.
```

In another embodiment, the average MAD is not allowed to change by more than a pre-defined fixed percentage amount. For example, in one embodiment, the historical average MAD may not be allowed to change by more than twenty percent (20%). However, other pre-defined percentage values may be used. Similarly other methods of capping the amount of change to the average MAD from a single complex video frame may also be used.

Current Buffer Limitations

As set forth with reference to FIGS. 2 and 3, the encoder must carefully allocate bit budgets to each video frame in a manner that avoids memory buffer problems in the digital video player system. This is a 'hard' limit in that the rate controller should always keep the frame sequence within the buffer top 450 and the buffer bottom 420 lines of FIG. 4 to prevent memory buffer overflow or memory buffer underflow in the digital video player, respectively. When the memory buffer in a digital video player begins to approach the level of an overflow or an underflow then the rate controller should make adjustments to the video frame bit budgets to compensate.

Figure 6:
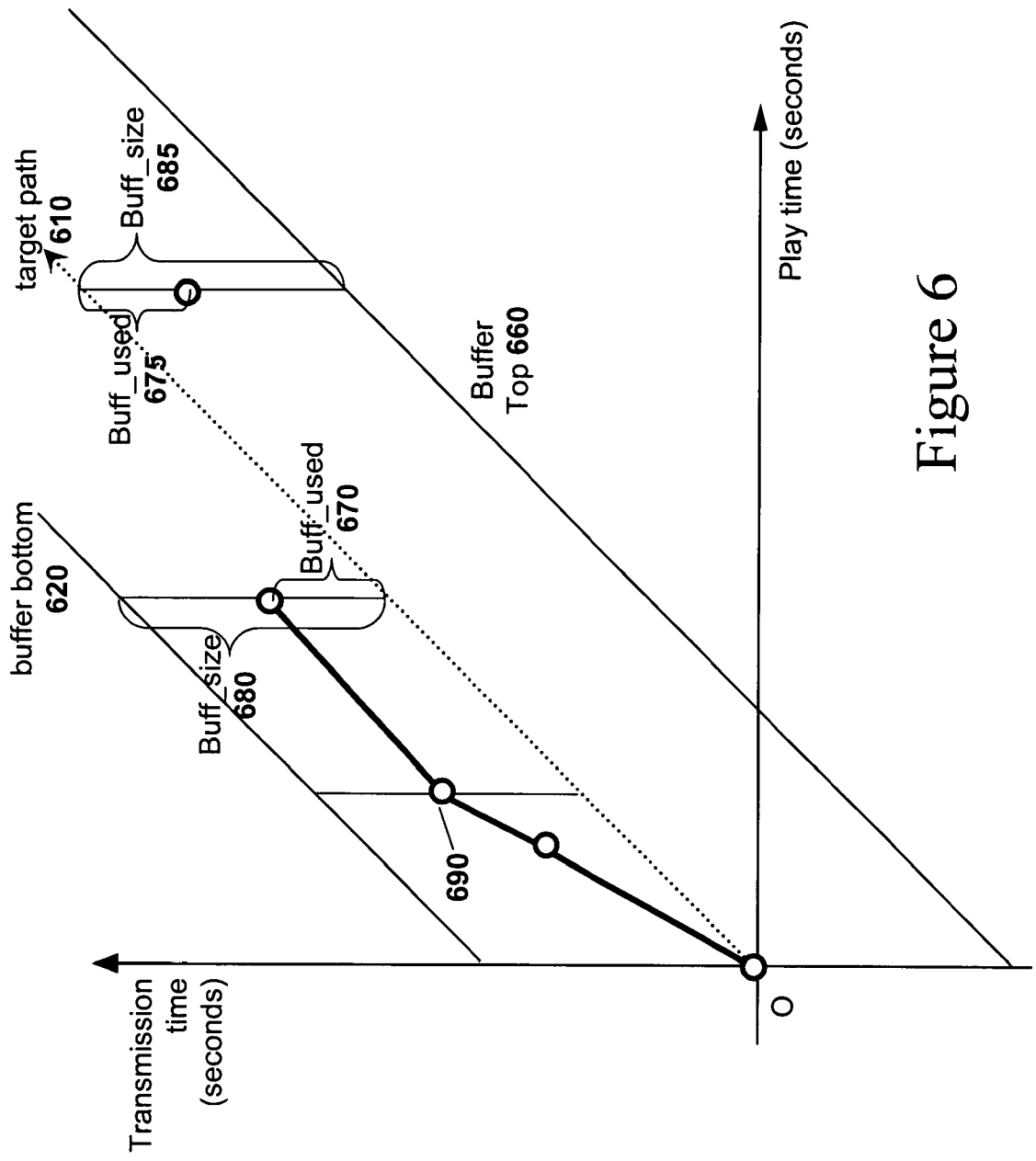
FIG. 6 illustrates a conceptual video frame transmission model and parameters used to calculate a buffer anxiety amount.

In one embodiment, a simple 'buffer anxiety' level may be calculated. The buffer anxiety value may be defined as the percentage of the memory buffer space used. The buffer anxiety value thus quantifies whether there is a danger of a memory buffer underflow or buffer overflow. The buffer anxiety is zero when the memory buffer level is right on the target transmission path. However, the buffer anxiety value will approach the "high-anxiety" value of one ("1") as the buffer memory value approaches the buffer bottom 420 or the buffer top 450. Referring to FIG. 6, if the transmission path is above the target transmission path 610 then the buffer anxiety is calculated relative to the chance of hitting the buffer bottom 620 and thus causing a buffer underflow. On the other hand, if the transmission path is below the target transmission path 610 then the buffer anxiety is calculated relative to the chance of hitting the buffer top 660 and thus causing a buffer overflow.

FIG. 6 graphically illustrates how the buffer anxiety for underflow may be calculated in one embodiment. Referring to FIG. 6, a buffer size amount (Buff_size) 680 is defined as the amount between the target path 610 and the buffer bottom 620. Similarly, a buffer used amount (Buff_used) 670 is defined as the amount between the target path 610 and the current buffer condition. In this manner, the buffer anxiety value for underflow purposes can be calculated as $$Buffer\_anxiety = Buff\_used/Buff\_size$$

If the amount of the memory buffer that has been used is small then the buffer anxiety value is close to zero. However, if nearly all the video frame information from the memory buffer has been used to display frames, the buffer anxiety value will be close to one ('1') indicating a high-anxiety condition. A similar calculation can be performed to calculate the buffer anxiety for overflow purposes. Specifically, memory buffer space used amount (Buff_used) 675 is divided by a memory buffer available amount (Buff_size) 685.

The buffer anxiety value can be used to scale down the amount of bits allocated to the next video frame. For example, a 'scale' amount can be determined and that scale amount is multiplied by the proposed bit budget. If the buffer anxiety zero, then no scaling is needed (scale=1). If the buffer anxiety value is very high (close to one) then the amount of bits allocated to the next video frame should be scaled down significantly (using scale amount close to zero).

Figure 7A:
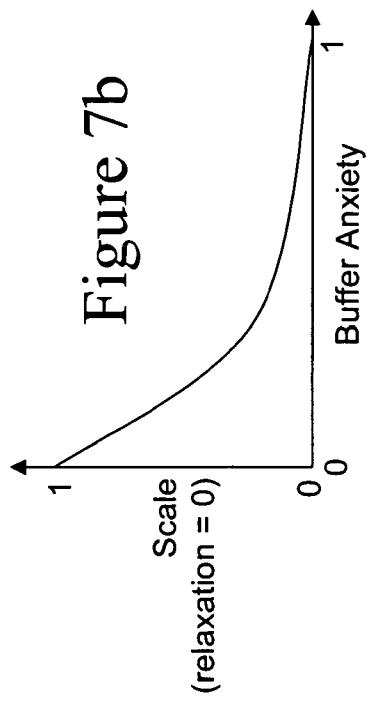
FIG. 7a illustrates one possible buffer anxiety to scaling factor curve.

FIG. 7a illustrates a scaling curve that may be used to determine a scale amount. The input buffer anxiety is on the x-axis (horizontal axis) and the corresponding output scale factor is illustrated on the y-axis (vertical axis). Thus, as illustrated in FIG. 7a, if there is no buffer anxiety (buffer anxiety ~0) then there is no scaling (scale=1) but if the buffer anxiety is very high (buffer anxiety ~1) then the scale factor reduces the bit budget (scale factor close to zero).

Such a scaling system will ensure that memory buffer limits in the digital video player are not violated. However, such a scaling system may be too aggressive such that the quality of the output video stream is unnecessarily limited to strictly prevent memory buffer underflow or memory buffer overflow. But if an encoder is confident that there will be no memory buffer underflow nor memory buffer overflow problems, then the encoder may wish to relax this strict scaling system. To allow for such a relaxation, the present invention introduces a 'relaxation' control, R that may be used to relax the strict scaling factor.

In one embodiment, the relaxation control R is set in a range from zero ("0") to one ("1"). The relaxation control is set to zero if no relaxation is allowed such that the scaling system strictly controls the bit budget to prevent any possible memory buffer underflow or memory buffer overflow from occurring. At the opposite end of the spectrum, the relaxation control may be set to one to prevent any scaling from being performed. (Setting relaxation to one is probably not advisable since a memory buffer underflow or a memory buffer overflow may then occur.)

To implement such a relaxation control system, the following equation is used to process the scaling factor, scale.

$$Scale = Relaxation + Scale - (Relaxation * Scale)$$

Figure 7B:
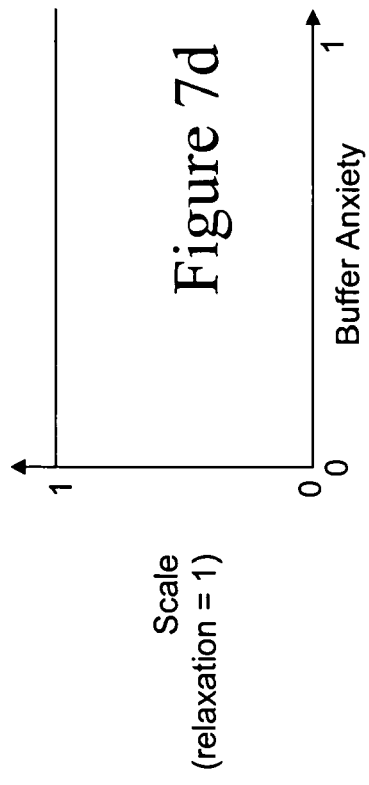
FIG. 7b illustrates the buffer anxiety to scaling factor curve of FIG. 7a with no relaxation.

FIG. 7b graphically illustrates how the scaling curve appears when the relaxation control is set to zero ("0"). As seen in FIG. 7b, the scaling curve is unchanged from the original scaling curve of FIG. 7a. Thus, with no relaxation (relaxation control=0), scaling is performed normally.

Figure 7C:
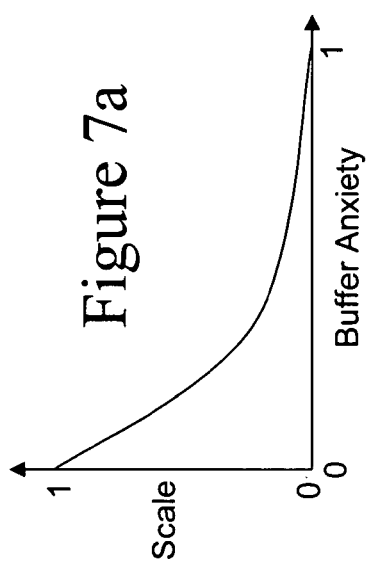
FIG. 7c illustrates the buffer anxiety to scaling factor curve of FIG. 7a with a fifty percent (0.5) relaxation factor.

FIG. 7c illustrates how the scaling curve appears when the relaxation control is set to one-half ("0.5"). As seen in FIG. 7c, the scaling curve now does not scale down the bit budget as aggressively as the original scaling curve since it has been partially 'relaxed.' However, the system will still scale down bit budgets.

Figure 7D:
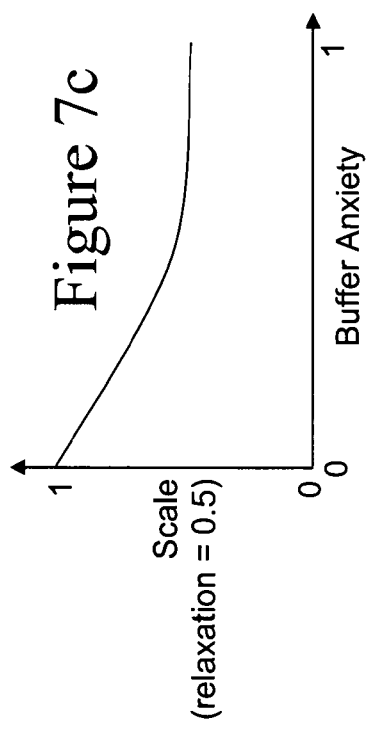
FIG. 7d illustrates the buffer anxiety to scaling factor curve of FIG. 7a with a one hundred percent (1.0) relaxation factor.

Finally, FIG. 7d illustrates how the scaling curve appears when the relaxation control is set to one ("1"). As seen in FIG. 7d, the scaling curve is simply a flat line at one ("1") such that no scaling is performed at all. Thus, the scaling has been fully 'relaxed' such that no scaling is performed.

The foregoing has described a system for performing rate control in a multi-media compression and encoding system. It is contemplated that changes and modifications may be made by one of ordinary skill in the art, to the materials and arrangements of elements of the present invention without departing from the scope of the invention.

We claim:

1. A method of encoding a current video frame in a sequence of video frames, the method comprising:
   determining a running complexity measure value for the sequence of video frames;
   determining a complexity measure for the current video frame that quantifies an amount of complexity of the current video frame;
   computing a difference between the complexity measure for the current video frame and the running complexity measure value;
   when the difference is larger than a predetermined limit, setting the difference to the predetermined limit;
   updating the running complexity measure value based on the difference; and
   at a rate controller, encoding the current video frame using the updated running complexity measure value.

2. The method of claim 1, wherein the predetermined limit is predetermined as a percentage value.

3. The method of claim 1, wherein encoding the current video frame comprises calculating a number of bits to encode the current video frame based on the updated running complexity measure value.

4. The method of claim 1, wherein updating the running complexity measure value comprises applying a first weighting factor to the running complexity measure value and a second weighting factor to the difference between the complexity measure for the current video and the running complexity measure value.

5. The method of claim 1, wherein the complexity measure for the current video frame is determined as a mean of sum of absolute difference values for a plurality of macroblocks of the current video frame.

6. The method of claim 1, wherein determining the running complexity measure value for the sequence of video frames comprises:
   determining an intra-frame running complexity measure value for a set of intra-frames in the sequence of video frames; and
   determining an inter-frame running complexity measure value for a set of inter-frames in the sequence of video frames.

7. The method of claim 6, wherein updating the running complexity measure value comprises:
   updating the intra-frame running complexity measure value when the current video frame is an intra-frame; and
   updating the inter-frame running complexity measure value when the current video frame is an inter-frame.

8. A non-transitory computer readable medium storing a computer program which when executed by a processor encodes a current video frame in a sequence of video frames, the computer program comprising sets of instructions for:
   determining a running complexity measure value for the sequence of video frames;
   determining a complexity measure for the current video frame that quantifies an amount of complexity of the current video frame;
   computing a difference between the complexity measure for the current video frame and the running complexity measure value;
   when the difference is larger than a predetermined limit, setting the difference to the predetermined limit;
   updating the running complexity measure value based on the difference; and
   encoding the current video frame using the updated running complexity measure value.

9. The non-transitory computer readable medium of claim 8, wherein the set of instructions for encoding the current video frame comprises a set of instructions for calculating a number of bits to encode the current video frame based on the updated running complexity measure value.

10. The non-transitory computer readable medium of claim 8, wherein the set of instructions for updating the running complexity measure value comprises a set of instructions for applying a first weighting factor to the running complexity measure value and a second weighting factor to the difference between the complexity measure for the current video and the running complexity measure value.

11. The non-transitory computer readable medium of claim 8, wherein the set of instructions for determining the running complexity measure value for the sequence of video frames comprises sets of instructions for:
    determining an intra-frame running complexity measure value for a set of intra-frames in the sequence of video frames; and
    determining an inter-frame running complexity measure value for a set of inter-frames in the sequence of video frames.

12. The non-transitory computer readable medium of claim 11, wherein the set of instructions for updating the running complexity measure value comprises sets of instructions for:
    updating the intra-frame running complexity measure value when the current video frame is an intra-frame; and
    updating the inter-frame running complexity measure value when the current video frame is an inter-frame.

13. A method of tracking digital video information complexity, the method comprising:
    determining a complexity measure for a current digital video picture, the complexity measure for the picture accounting for a plurality of macroblocks in the picture;
    combining the complexity measure for the current digital video picture to a running average complexity measure for a series of digital video pictures, the combining comprising applying a first weighting factor to the complexity measure for the current digital video picture and a second weighting factor to the running average complexity measure for the series of digital video pictures; and
    at a rate controller, encoding the digital video information utilizing the running average complexity measure.

14. The method of claim 13, wherein the running average complexity measure is not allowed to change by more than a predetermined percentage.

15. The method of claim 13, wherein the running average complexity meausure is processed by a non-linear smoothing filter.

16. The method of claim 13 further comprising determining a value for the current digital video picture that represents a deviation between the current digital video picture and an average digital video picture in terms of bits needed to encode the current digital video picture for a particular desired visual quality,
    wherein encoding the digital video information comprises using the determined value for the current digital video picture.

17. The method of claim 16, wherein the value for the current digital video picture is determined based on the complexity measure for the current digital video picture and the combined running average complexity meausure.

18. The method of claim 13, wherein the complexity measure for the current digital video picture is determined as a mean of sum of absolute difference values for the plurality of macroblocks of the current digital video picture.

19. The method of claim 13, wherein applying a first weighting factor to the complexity measure for the current digital video picture and a second weighting factor to the running average complexity measure for the series of digital video pictures comprises applying a first weighting factor that is larger than the second weighting factor.

20. A non-transitory computer-readable medium storing a computer program which when executed by a processor tracks digital video information complexity, the computer program comprising sets of instructions for:

determining a complexity measure for a current digital video picture, the complexity measure for the picture accounting for a plurality of macroblocks in the picture;

combining the complexity measure for the current digital video picture to a running average complexity measure for a series of digital video pictures, wherein the set of instructions for combining comprises a set of instructions for applying a first weighting factor to the complexity measure for the current digital video picture and a second weighting factor to the running average complexity measure for the series of digital video pictures; and encoding the digital video information utilizing the running average complexity measure.

21. The non-transitory computer-readable medium of claim 20, wherein the running average complexity measure is not allowed to change by more than a predetermined percentage.

22. The non-transitory computer-readable medium of claim 20, the computer program further comprising a set of instructions for determining a value for the current digital video picture that represents a deviation between the current digital video picture and an average digital video picture in terms of bits needed to encode the current digital video picture for a particular desired visual quality, wherein the set of instructions for encoding the digital video information comprises a set of instructions for using the determined value for the current digital video picture.

23. The non-transitory computer-readable medium of claim 22, wherein the value for the current digital video picture is determined based on the complexity measure for the current digital video picture and the combined running average complexity measure.

* * * * *